(12) United States Patent
Weiss et al.

(10) Patent No.: US 12,525,804 B2
(45) Date of Patent: Jan. 13, 2026

(54) VIRTUAL SYNCHRONOUS MACHINES WITH IMPROVED VOLTAGE AND FREQUENCY CONTROL

(71) Applicant: RAMOT AT TEL-AVIV UNIVERSITY LTD., Tel Aviv (IL)

(72) Inventors: George Weiss, Tel Aviv (IL); Zeev Kustanovich, Tel Aviv (IL); Benjamin Shani, Tel Aviv (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 387 days.

(21) Appl. No.: 18/008,454

(22) PCT Filed: Jul. 7, 2021

(86) PCT No.: PCT/IB2021/056069
§ 371 (c)(1),
(2) Date: Dec. 6, 2022

(87) PCT Pub. No.: WO2022/009101
PCT Pub. Date: Jan. 13, 2022

(65) Prior Publication Data
US 2023/0208140 A1 Jun. 29, 2023

Related U.S. Application Data

(60) Provisional application No. 62/705,636, filed on Jul. 8, 2020.

(51) Int. Cl.
*H02M 7/537* (2006.01)
*H02J 3/24* (2006.01)
(52) U.S. Cl.
CPC ............... *H02J 3/24* (2013.01); *H02M 7/537* (2013.01)

(58) Field of Classification Search
CPC ...... H02M 7/537; H02M 7/533; H02M 7/527; H02M 7/529; H02M 7/525; H02J 3/24; H02J 3/241; H02J 3/242
See application file for complete search history.

(56) References Cited

U.S. PATENT DOCUMENTS 8,880,236 B2 11/2014 Weiss et al.
2016/0006338 A1* 1/2016 Sakimoto .......... H02M 7/53875
363/131

(Continued)

FOREIGN PATENT DOCUMENTS

CN 103683331 A 3/2014
CN 104953617 A 9/2015

(Continued)

OTHER PUBLICATIONS

Alipoor et al., "Distributed Generation Grid Integration Using Virtual Synchronous Generator With Adoptive Virtual Inertia," Proceedings of the IEEE Energy Conversion Congress and Exposition (ECCE), pp. 4546-4552, Sep. 2013.

(Continued)

*Primary Examiner* — Nguyen Tran
(74) *Attorney, Agent, or Firm* — Meitar Patents Ltd.; Daniel Kligler (57) ABSTRACT

Electrical apparatus (20) includes an inverter (24) having input terminals for receiving DC input power and output terminals for coupling to an AC power grid. A pulse-width modulation (PWM) generator and drivers (26) drive the switches so as to control respective amplitudes, frequencies, and phases of the output current waveforms of the inverter. Control circuitry (28) receives measurements of respective time-varying voltages and currents on the input and output terminals, computes a model (40) that includes three virtual currents flowing in a synchronous machine that is emulated by the apparatus, wherein the three virtual currents are (Continued)

associated respectively with the three output current waveforms, and controls the PWM generator and drivers responsively to the three virtual currents so as to synchronize the amplitudes, frequencies, and phases of the three output current waveforms of the inverter with the three phases of the AC power grid.

23 Claims, 5 Drawing Sheets

(56) References Cited

U.S. PATENT DOCUMENTS

| | | | |
|---|---|---|---|
| 2019/0123559 A1* | 4/2019 | Dong | H02M 5/4585 |
| 2019/0222026 A1 | 7/2019 | Zhong | |
| 2020/0091728 A1 | 3/2020 | Cassoli et al. | |
| 2021/0194383 A1* | 6/2021 | Tsuruma | H02J 3/38 |

FOREIGN PATENT DOCUMENTS

| | | |
|---|---|---|
| CN | 106786599 A | 5/2017 |
| EP | 2963759 A1 | 1/2016 |
| JP | 2013-162699 A | 8/2013 |
| JP | 2014-168351 A | 9/2014 |
| JP | 2019-004571 A | 1/2019 |
| WO | 2015075923 A1 | 5/2015 |

OTHER PUBLICATIONS

Aouini et al., "Synchronverter-Based Emulation and Control of HVDC Transmission," IEEE Transactions on Power Systems, vol. 31, No. 1286, pp. 278-286, year 2016.

Barabanov et al., "Conditions for Almost Global Attractivity of a Synchronous Generator Connected to an Infinite Bus," IEEE Transactions on Automatic Control, vol. 62, No. 10, pp. 4905-4916, year 2017.

Beck et al., "Virtual Synchronous Machine," Proceedings of the 9th International Conference on Electrical Power Quality and Utilisation (EPQU), pp. 1-6, Oct. 2007.

Blau et al., "Synchronverters Used for Damping Inter-Area Oscillations in Two-Area Power Systems," International Conference on Renewable Energies and Power Quality (ICREPQ'18), published in Renewable Energy and Power Quality Journal, vol. 1, No. 16, pp. 45-50, Apr. 2018.

Chen et al., "Modelling, Implementation, and Assessment of Virtual Synchronous Generator in Power Systems," Journal of Modern Power Systems and Clean Energy, pp. 1-13, year 2020.

Cvetkovic et al., "Modeling and Control of Grid-Connected Voltage-Source Converters Emulating Isotropic and Anisotropic Synchronous Machines," Proceedings of the 16th IEEE Workshop on Control and Modeling for Power Electronics (COMPEL), pp. 1-6, Jul. 2015.

Dong et al., "Adjusting Synchronverter Dynamic Response Speed via Damping Correction Loop," IEEE Transactions on Energy Conversion, vol. 32, No. 2, pp. 608-619, Jun. 2017.

Dong et al., "Active Voltage Feedback Control for Hybrid Multiterminal HVDC System Adopting Improved Synchronverters," IEEE Trans. on Power Delivery, vol. 31, No. 2, pp. 445-455, Apr. 2016.

Driesen et al., "Virtual Synchronous Generators," IEEE Power and Energy Soc. General Meeting—Conversion and Delivery of Electrical Energy in the 21st Century, pp. 1-3, Jul. 2008.

Francis et al., "The Internal Model Principle for Linear Multivariable Regulators," Applied Mathematics and Optimization, vol. 2, pp. 170-194, Jan. 1975.

Grainger et al., "Power Systems Analysis," McGraw-Hill, Inc., New York, pp. 1-809, year 1994.

Isidori et al., "Output Regulation of Nonlinear Systems," IEEE Transactions on Automatic Control, vol. 35, issue 2, pp. 131-140, Feb. 1990.

Konstantopoulos et al., "Bounded Integral Control for Regulating Input-to-State Stable Non-Linear Systems," IEEE-ACC paper, pp. 4024-4029, Jul. 2015.

Kundur, "Power System Stability and Control," McGraw-Hill, Inc., New York, pp. 1-1199, year 1994.

Kustanovich et al., "The Sensitivity of Grid-Connected Synchronverters with Respect to Measurement Errors," IEEE Access, Open Access Journal, pp. 1-11, Jun. 2021.

Lifshitz et al., "Optimal Control of a Capacitor-Type Energy Storage System," IEEE Transactions on Automatic Control, vol. 60, pp. 216-220, year 2015.

Lorenzetti et al., "Integral Control of Stable Nonlinear Systems based on Singular Perturbations," IFAC papers online, vol. 53, issue 2, pp. 6157-6164, year 2020.

Mandel et al., "Adaptive Internal Model Based Suppression of Torque Ripple in Brushless DC Motor Drives," Systems Science & Control Engineering, vol. 5, pp. 162-176, year 2015.

Margaliot et al., "The Low-Frequency Distortion in D-Class Amplifiers," IEEE Transactions on Circuits and Systems II, vol. 57, No. 10, pp. 772-776, Oct. 2010.

Mo et al., "Evaluation of Virtual Synchronous Machines with Dynamic or Quasi-Stationary Machine Models," IEEE Transactions on Industrial Electronics, vol. 64, p. 5952-5962, year 2017.

Natarajan et al., "Synchronverters with Better Stability due to Virtual Inductors, Virtual Capacitors, and Anti-Windup," IEEE Trans. on Industrial Electronics, vol. 64, issue 7, pp. 5994-6004, year 2017.

Natarajan et al., "Almost Global Asymptotic Stability of a Grid-Connected Synchronous Generator," Mathematics of Control, Signals and Systems, vol. 30, pp. 1-43, year 2018.

Rebarber et al., "Internal Model Based Tracking and Disturbance Rejection for Stable Well-Posed Systems," Automatica, vol. 39, pp. 1555-1599, Aug. 2003.

Roldan-Perez et al., "Harmonic Virtual Impedance Design for Parallel-Connected Grid-Tied Synchronverters," IEEE Journal of Emerging and Selected Topics in Power Electronics, vol. 7, No. 1, pp. 493-503, Mar. 2019.

Roldan-Perez et al., "Parallel Current-Controlled Synchronverters for Voltage and Frequency Regulation in Weak Grids", Journal of Engineering, vol. 2019, issue 17, pp. 3516-3520, Apr. 2018.

Roldan-Perez et al., "Virtual Synchronous Machine Control of VSC HVDC for Power System Oscillation Damping," IECON 2018—44th Annual Conference of the IEEE Industrial Electronics Society, pp. 6026-6031, year 2018.

Sauer et al., "Power Systems Dynamics and Stability," The University of Illinois at Urbana-Champaign, pp. 1-361, year 1997.

Shafiee et al., "Distributed Secondary Control for Islanded MicroGrids—A Novel Approach," IEEE Trans. on Power Electronics, vol. 29, No. 2, pp. 1018-1031, Feb. 2014.

Shivratri et al., "Virtual Synchronous Machines with Fast Current Loop," Conference Paper, IFAC World Congress, vol. 53, issue 2, pp. 12422-12428, year 2020.

Tayyebi et al., "Frequency Stability of Synchronous Machines and Grid-Forming Power Converters," IEEE Journal of Emerging and Selected Topics in Power Electronics, vol. 8, pp. 1004-1018, year 2020.

Timbus et al., "Evaluation of Current Controllers for Distributed Power Generation Systems," IEEE Transactions on Power Electronics, vol. 24, No. 3, p. 654-664, Mar. 2009.

Weiss et al., "Stability Analysis for Coupled Synchronous Generators with Virtual Friction," Conference Paper, International Conference on Digital Signal Processing (DSP), London, pp. 1-6, Aug. 2017.

Wang et al., "Virtual-Impedance-Based Control for Voltage-Source and Current-Source Converters," IEEE Transactions on Power Electronics, vol. 30, No. 12, pp. 7019-7037, Dec. 2015.

Weiss et al., "A Stability Theorem for Networks Containing Synchronous Generators," Systems & Control Letters, vol. 134, pp. 1-9, year 2019.

Wu et al., "Small-Signal Modeling and Parameters Design of Virtual Synchronous Generators," IEEE Transactions on Industrial Electronics, vol. 63, No. 7, pp. 4292-4303, Jul. 2016.

Yu et al., "Investigations of the Constraints Relating to Penetration of Non-Synchronous Generation (NSG) in Future Power Systems,"

(56) References Cited

OTHER PUBLICATIONS

Conference Paper, Protection, Automation and Control (PAC) World Conference, Glasgow, UK, pp. 1-9, Jun.-Jul. 2015.

Zhong et al., "Control of Power Inverters in Renewable Energy and Smart Grid Integration," Wiley, Chichester, UK, pp. 1-416, year 2013.

Zhong et al., "Improved Synchronverters with Bounded Frequency and Voltage for Smart Grid Integration," IEEE Transactions on Smart Grid, vol. 9, No. 2, pp. 786-796, Mar. 2018.

Zhong et al., "Self-Synchronized Synchronverters: Inverters without a Dedicated Synchronization Unit," IEEE Transactions on Power Electronics, vol. 29, No. 2, pp. 617-630, Feb. 2014.

Zhong et al., "Static Synchronous Generators for Distributed Generation and Renewable Energy," Proceedings of the IEEE PES Power Systems Conference & Exhibition (PSCE), Washington, USA, pp. 1-7, Apr. 2009.

Zhong et al., "Synchronverters: Inverters that Mimic Synchronous Generators," IEEE Transactions on Industrial Electronics, vol. 58, No. 4, pp. 1259-1267, Apr. 2011.

Shuai et al., "Characteristics and Restraining Method of Fast Transient Inrush Fault Currents in Synchronverters," IEEE Transactions on Industrial Electronics, vol. 64, issue 9, pp. 7487-7497, Sep. 2017.

International Application # PCT/IB2021/056069 Search Report dated Oct. 21, 2021.

Wen et al., "Comprehensive perspective on virtual inductor for improved power decoupling of virtual synchronous generator control," IET Renewable Power Generation, The Institution of Engineering and Technology, vol. 14, No. 4, pp. 485-494, Mar. 16, 2020.

EP Application # 21838662.1 Search Report dated Aug. 5, 2024.

Natarajan et al IEEE Transactions on Industrial Electronics, "Synchronverters With Better Stability Due to Virtual Inductors, Virtual Capacitors, and Anti-Windup", vol. 64, Issue: 7, Date: Jul. 2017, pp. 5994-6004.

Zhong et al, IEEE Transactions on Power Electronics, "Self-Synchronized Synchronverters: Inverters Without a Dedicated Synchronization Unit" vol. 29, Issue: 2, Date: Feb. 2014, pp. 617-630.

JP Office Action # 2023-501072, dated Mar. 27, 2025.

\* cited by examiner

VIRTUAL SYNCHRONOUS MACHINES WITH IMPROVED VOLTAGE AND FREQUENCY CONTROL

CROSS-REFERENCE TO RELATED APPLICATION

This application claims the benefit of U.S. Provisional Patent Application 62/705,636, filed Jul. 8, 2020, which is incorporated herein by reference.

FIELD OF THE INVENTION

The present invention relates generally to electrical power generation, and particularly to inverters and methods for conversion of DC to AC power.

BACKGROUND

The electrical power system is shifting increasingly from centralized generation by large power plants to distributed generation based on renewable energy resources. Most of these renewable energy generators produce either variable-frequency AC power, as in wind turbines, or DC power, as in solar panels. Consequently, such generators require DC-AC converters, referred to as "inverters," to feed AC power at the proper grid frequency (50 or 60 Hz) to the public utility grid. Such inverters should be carefully controlled, in terms of output currents, frequency, and phase angle, to provide high-quality supply waveforms to consumers.

Specifically, to provide stable power on the public utility grid (also called the power grid), it is desirable that inverters operate in close synchronization with the grid frequency and phase, and should supply a clean waveform of the grid current with minimal fluctuations and noise. In recent years, it has been recognized that as inverters become more widespread, they should participate in maintaining the stability of frequency and voltage on the utility grid, and they should also help the grid to overcome various types of sudden changes and faults, similarly to synchronous generators and their prime movers.

Inverters that imitate the behavior of synchronous generators and their prime movers are known in the art as "virtual synchronous machines" (VSMs). The VSM produces a set of adjustable multi-phase output voltages, which may be coupled to an AC power grid via output filters, for the purpose of exchanging independently-controllable real and reactive power. The VSM is intended to behave like an actual synchronous generator in a conventional power plant, including its inertia, but without having moving parts.

In fact, in many respects, a VSM may behave better (for grid stability) than a synchronous generator, because its parameters are adjustable, and it can react much faster to various changes that may occur on the power grid.

As an example, U.S. Pat. No. 8,880,236, whose disclosure is incorporated herein by reference, describes a type of VSM that is known as a "synchronverter," which is controlled by modeling a synchronous generator. The inverter in the synchronverter is controlled by representing the angular position and rotational speed of a virtual generator rotor using numerical variables. The output current of the inverter is measured and used in calculating a virtual electric torque acting on the virtual generator rotor. The rotational speed of the virtual rotor is calculated from the virtual electromagnetic torque and a parameter representing the virtual inertia of the virtual rotor. From the variables representing the angular position and rotational speed of the virtual generator rotor and the excitation current, a control signal is calculated for controlling the inverter to produce AC output corresponding to that of the virtual synchronous generator. A feedback loop is implemented in which deviation of the rotational speed of the virtual generator rotor from a reference rotational speed is detected and used to adjust the virtual drive torque.

SUMMARY

Embodiments of the present invention that are described hereinbelow provide improved virtual synchronous machines (VSMs), as well as circuits and methods for controlling such machines.

There is therefore provided, in accordance with an embodiment of the invention, electrical apparatus, including an inverter having input terminals for receiving DC input power and output terminals for coupling to an AC power grid having three phases, and including an array of switches and filtering circuits configured to convert the DC input power to three-phase AC output power, by producing three output current waveforms at the output terminals A pulse-width modulation (PWM) generator and drivers are coupled to drive the switches so as to control respective amplitudes, frequencies, and phases of the output current waveforms. Control circuitry is coupled to receive measurements of respective time-varying voltages and currents on the input and output terminals, and to compute a model, responsively to the measurements, that includes three virtual currents flowing in a synchronous machine that is emulated by the apparatus, wherein the three virtual currents are associated respectively with the three output current waveforms, and to control the PWM generator and drivers responsively to the three virtual currents so as to synchronize the amplitudes, frequencies, and phases of the three output current waveforms of the inverter with the three phases of the AC power grid.

In some embodiments, the model includes current control loops, which generate three control voltages for controlling the PWM generator and drivers, and the control circuitry is configured to compute, responsively to the virtual currents, reference currents for input to the current control loops. In a disclosed embodiment, the control circuitry is configured to ramp the reference currents from zero to the virtual currents upon initiation of operation of the apparatus. Additionally or alternatively, the current control loop includes virtual capacitors, which are applied to filter DC components out of the three output current waveforms by modifying average voltages output from the array of switches.

In some embodiments, the emulated synchronous machine has a given rotor angular frequency and rotor field, and the control circuitry is configured to compute, responsively to the virtual currents, the rotor field, and a difference between the rotor angular frequency and a grid frequency of the AC power grid, an emulated limited active torque and an emulated electrical torque, for application to the synchronous machine, thus determining a time derivative of the rotor angular frequency. In a disclosed embodiment, the emulated limited active torque includes a droop torque, which is computed by applying a lead-lag filter to the difference between the rotor angular frequency and a desired angular frequency. Alternatively or additionally, the control circuitry is configured to apply a saturation to limit a low-frequency component of the active torque, thus determining the limited active torque.

Further additionally or alternatively, the control circuitry is configured to compute an electrical torque of the emulated synchronous machine based on the virtual currents and the rotor field, and to compute synchronous internal voltages of the emulated synchronous machine responsively to the rotor angular frequency, the rotor field, and a rotor angle of the emulated synchronous machine. In a disclosed embodiment, the control circuitry is configured to compute a reactive power at the output terminals of the inverter and the rotor field of the emulated synchronous machine responsively to a voltage droop constant, a difference between an amplitude of a grid voltage of the AC power grid and a first preset value of the grid voltage, and a difference between a reactive power at the output terminals of the inverter and a second preset value of the reactive power. In another embodiment, the control circuitry is configured to compute a difference voltage between the computed synchronous internal voltages and the measurements of the time-varying voltages, and to compute the virtual currents by applying a virtual impedance to the difference so as to eliminate a DC component in the virtual currents.

In a disclosed embodiment, the filtering circuits in the inverter have a given inductance and resistance, and the model includes an equivalent stator inductance and resistance of the synchronous machine that are larger than the given inductance and resistance.

There is also provided, in accordance with an embodiment of the invention, a method for electrical power control, which includes applying a pulse-width modulation (PWM) drive to an inverter having input terminals for receiving a DC input voltage and output terminals for coupling to an AC power grid having three phases, and including an array of switches and filtering circuits configured to convert the DC input voltage to a three-phase AC output, including three output voltage waveforms, at the output terminals. Measurements of respective time-varying voltages and currents on the input and output terminals are received. A model is computed, responsively to the measurements, that includes three virtual currents flowing in a synchronous machine that is emulated by the method, wherein the three virtual currents are associated respectively with the three output voltage waveforms. The PWM drive is controlled responsively to the three virtual currents so as to synchronize respective amplitudes, frequencies, and phases of the three output waveforms of the inverter with the three phases of the AC power grid.

There is additionally provided, in accordance with an embodiment of the invention, a computer software product for controlling a pulse-width modulation (PWM) drive that is applied to an inverter having input terminals for receiving a DC input voltage and output terminals for coupling to an AC power grid having three phases, and including an array of switches and filtering circuits configured to convert the DC input voltage to a three-phase AC output, including three output voltage waveforms, at the output terminals, the product including a tangible, non-transitory computer-readable medium in which program instructions are stored. The instructions, when read by a programmable processor, cause the processor to receive measurements of respective time-varying voltages and currents on the input and output terminals, to compute a model, responsively to the measurements, that includes three virtual currents flowing in a synchronous machine that is emulated by the method, wherein the three virtual currents are associated respectively with the three output voltage waveforms, and to control the PWM drive responsively to the three virtual currents so as to synchronize respective amplitudes, frequencies, and phases of the three output waveforms of the inverter with the three phases of the AC power grid.

The present invention will be more fully understood from the following detailed description of the embodiments thereof, taken together with the drawings in which:

DETAILED DESCRIPTION OF EMBODIMENTS

Overview

As long as inverters provide only a small fraction of the power on the public grid, fluctuations in their active power, reactive power, local voltage, frequency and phase can easily be compensated for by the conventional synchronous generators that provide most of the grid power. As renewable energy sources become more prevalent, however, these fluctuations can lead to unacceptable variations in power provided to consumers. Although VSMs can, in principle, emulate the behavior of synchronous generators and provide more stable AC output power, precise control of the VSM remains a challenge.

For example, the inventors have found that the output currents of a synchronverter are excessively sensitive to grid voltage measurement errors and to delays that appear while taking measurements, processing data, and generating PWM signals. These errors cause distortions of the grid currents and unsteady amplitude, especially when the synchronverter works at relatively low power, and can result in loss of synchronization, leading to disconnection.

Embodiments of the present invention that are described herein use a model of the VSM that includes virtual current control loops to reduce the effect of measurement errors and delays. Virtual capacitors in the model reduce the DC component in the actual output currents generated by the inverter. The disclosed control model also includes a mechanism for ensuring a smooth start-up of the VSM, in order to protect the inverter and avoid disrupting the grid during the start-up period.

The VSM model used in embodiments of the present invention emulates the frequency droop functionality of a synchronous generator, which causes the active torque of the generator model to change in order to compensate for frequency shifts. The model uses lead-lag filtering of the droop signal to achieve a moderate droop constant at steady state (thus, avoiding a power surge, which is difficult to sustain, if the grid frequency deviates from its nominal value for a long time), while still maintaining a higher droop constant for fast changes of the grid frequency, thus providing the stabilizing effect of the higher droop constant.

The VSM model used in embodiments of the present invention also emulates the voltage droop functionality of a synchronous generator, which causes the field current of the generator model to change in order to compensate for voltage deviations from the desired local voltage.

The methods and control model provided by the embodiments described herein can thus be applied in making and operating synchronverters that are robust against voltage sensing errors, grid voltage imbalance, and distortion. These methods protect the inverter and the grid against extreme operating conditions. Synchronverters that operate in accordance with these embodiments can be integrated readily into the power grid, as well as into high-quality private electrical supply grids.

To implement these features, the disclosed embodiments provide electrical apparatus comprising an inverter, which has input terminals for receiving a DC input voltage and output terminals for coupling to a three-phase AC power grid. The inverter comprises an array of switches and filtering circuits for converting the DC input voltage to a three-phase AC output. A pulse-width modulation (PWM) generator and drivers control the switches so as to produce the desired amplitudes, frequencies, and phases of the three output voltage waveforms at the output terminals of the inverter legs, i.e., the voltages before the output filters. The control circuitry receives measurements of respective time-varying voltages and currents on the output terminals and based on these measurements, models three virtual currents flowing in the VSM. These virtual currents are limited to protect the inverter, and after this limitation they become reference currents.

The current control part of the algorithm controls the PWM generator and the drivers so that the output currents of the inverter become nearly equal to the reference currents. Thus, the inverter behaves according to the VSM model of the synchronous generator.

System Description

Figure 1:
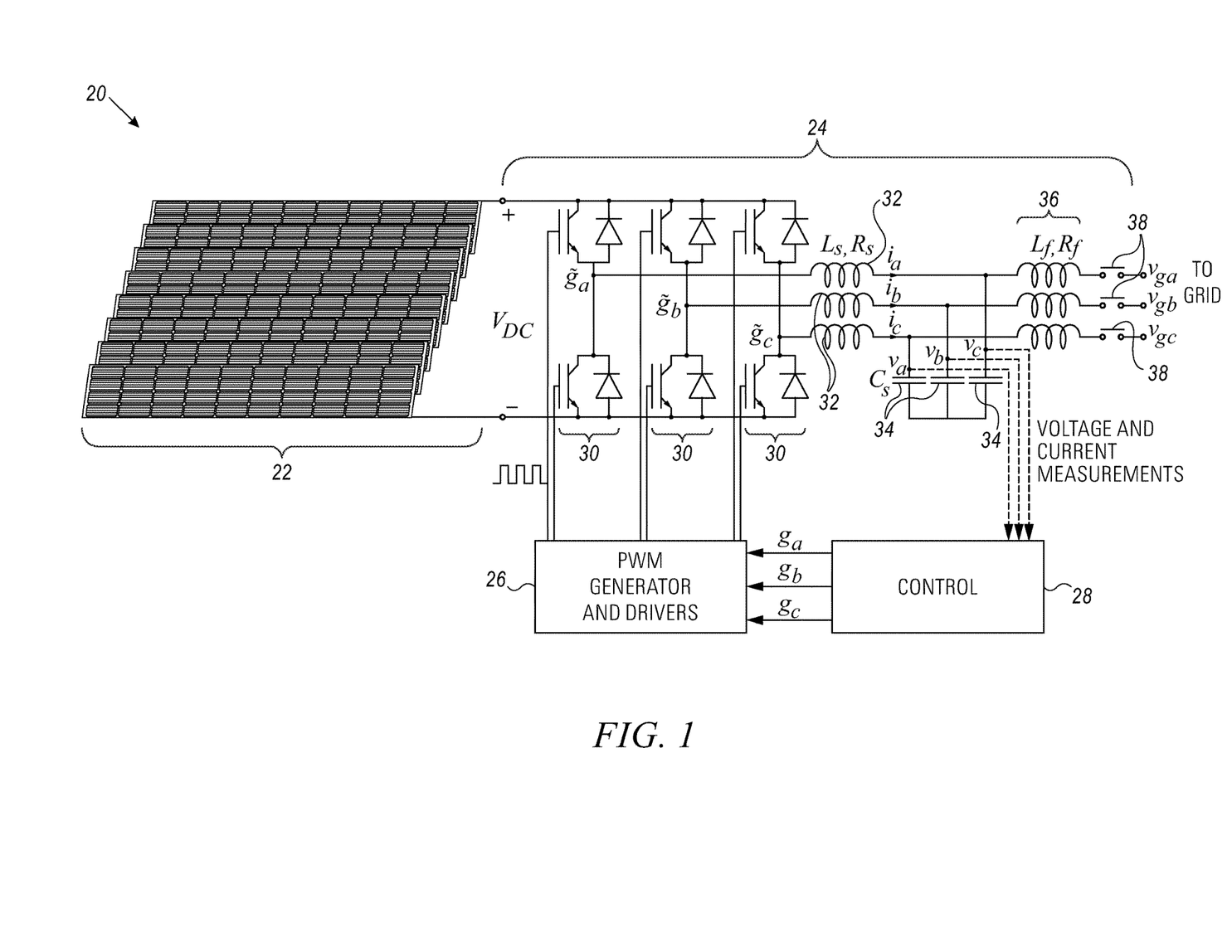
FIG. 1 is a block diagram that schematically illustrates an electrical power generation system incorporating a VSM, in accordance with an embodiment of the invention.

FIG. 1 is a block diagram that schematically illustrates an electrical power generation system 20 incorporating a VSM, in accordance with an embodiment of the invention. System 20 comprises a DC power source 22 (such as an array of solar panels in the pictured example), which is connected to provide a DC input voltage $V_{DC}$ to the input terminals of an inverter 24.

Inverter 24 comprises an array of switches 30 and filtering circuits, including inductors 32 and capacitors 34 in an LCL filter configuration. Inductors 32 are each characterized by inductance $L_S$ and series resistance $R_S$, while capacitors 34 have capacitance $C_S$, which is chosen so that the LCL filters have a resonant frequency higher than the nominal grid frequency $\omega_n$ but well below the switching frequency. Inverter 24 converts the DC input voltage to a three-phase AC output, including three output current waveforms, with time-varying currents $i_a$, $i_b$, and $i_c$, at the output terminals of the inverter. The output terminals are connected to the AC grid by inductors 36, with inductance Lf and series resistance $R_f$, as well as circuit breakers 38. The grid voltages are $v_{ga}$, $v_{gb}$, and $v_{gc}$.

A pulse-width modulation (PWM) generator and drivers 26 drive switches 30 so as to control the respective amplitudes, frequencies, and phases of the average voltage waveforms $\widetilde{g_a}$, $\widetilde{g_b}$ and $\widetilde{g_c}$. These averages are computed over each switching period, which is much shorter than the period of the grid voltage. PWM generator and drivers 26 typically comprise suitable hardware logic and amplifier circuits, as are known in the art. Under the control of PWM generator and drivers 26, switches 30 generate respective average voltages $\widetilde{g_a}$, $\widetilde{g_b}$ and $\widetilde{g_c}$, which are filtered by the LCL filters to smooth the waveforms and reduce the ripple in the output terminal voltages $v_a$, $v_b$, and $v_c$ and the output terminal currents $i_a$, $i_b$, and $i_c$ of the three AC output phases.

Control circuitry 28 receives measurements of $v_a$, $v_b$, $v_c$ and $i_a$, $i_b$, $i_c$ and applies these measurements in modeling corresponding virtual currents $i_{virt,a}$, $i_{virt,b}$ and $i_{virt,c}$ flowing in a model of a synchronous machine that inverter 24 is to emulate. Based on this synchronous machine model, control circuitry 28 outputs respective signals $g_a$, $g_b$, and $g_c$, which are the desired values for $\widetilde{g_a}$, $\widetilde{g_b}$ and $\widetilde{g_c}$. The PWM generator produces the logical signals that are applied via the drivers to switches 30. As a result of correctly generated PWM signals, the voltages $\widetilde{g_a}$, $\widetilde{g_b}$ and $\widetilde{g_c}$ will closely match the signals $g_a$, $g_b$, and $g_c$, and as a consequence, the currents $i_a$, $i_b$, and $i_c$ will closely match the virtual currents $i_{virt,a}$, $i_{virt,b}$ and $i_{virt,c}$.

Control circuitry 28 adjusts the control signals $g_a$, $g_b$, and $g_c$ as necessary to synchronize the amplitudes, frequencies, and phases of the three output waveforms of inverter 24 with the three phases of the AC power grid. The novel model that is used by control circuitry 28 and its application in generating and adjusting the control voltages are presented are described in detail hereinbelow. For convenience in the description below and in the figures, these voltages and currents are represented collectively by the vectors $v=(v_a, v_b, v_c)$, $i=(i_a, i_b, i_c)$, and $g=(g_a, g_b, g_c)$.

Control circuitry 28 typically comprises a programmable processor, such as a general-purpose microprocessor or a digital signal processor (DSP), with suitable interfaces for receiving and outputting signals from and to inverter 24 and PWM generator and drivers 26, as well as other control inputs. The processor performs these functions under the control of suitable software program instructions. The software is typically stored in tangible, non-transitory computer-readable media, such as optical, magnetic, or electronic memory media. Alternatively or additionally, at least some of the functions of control circuitry 28 may be carried out by hardware logic circuits, which may be hard-wired or programmable.

Inverter 24 and PWM generator and drivers 26 are presented here by way of example, to demonstrate the application and operation of control circuitry 28. Further details of the design and operation of inverter 24 and PWM generator and drivers 26, as well as modeling and control of these elements to emulate a synchronous machine, are described in sections I, II and III of the specification of the above-mentioned U.S. Pat. No. 8,880,236. Alternatively, control circuitry 28 may be applied, mutatis mutandis, in controlling inverters of other types that are known in the art. All such applications of control circuitry 28 are considered to be within the scope of the present invention.

VSM Control Using Modeled Currents

Figure 2:
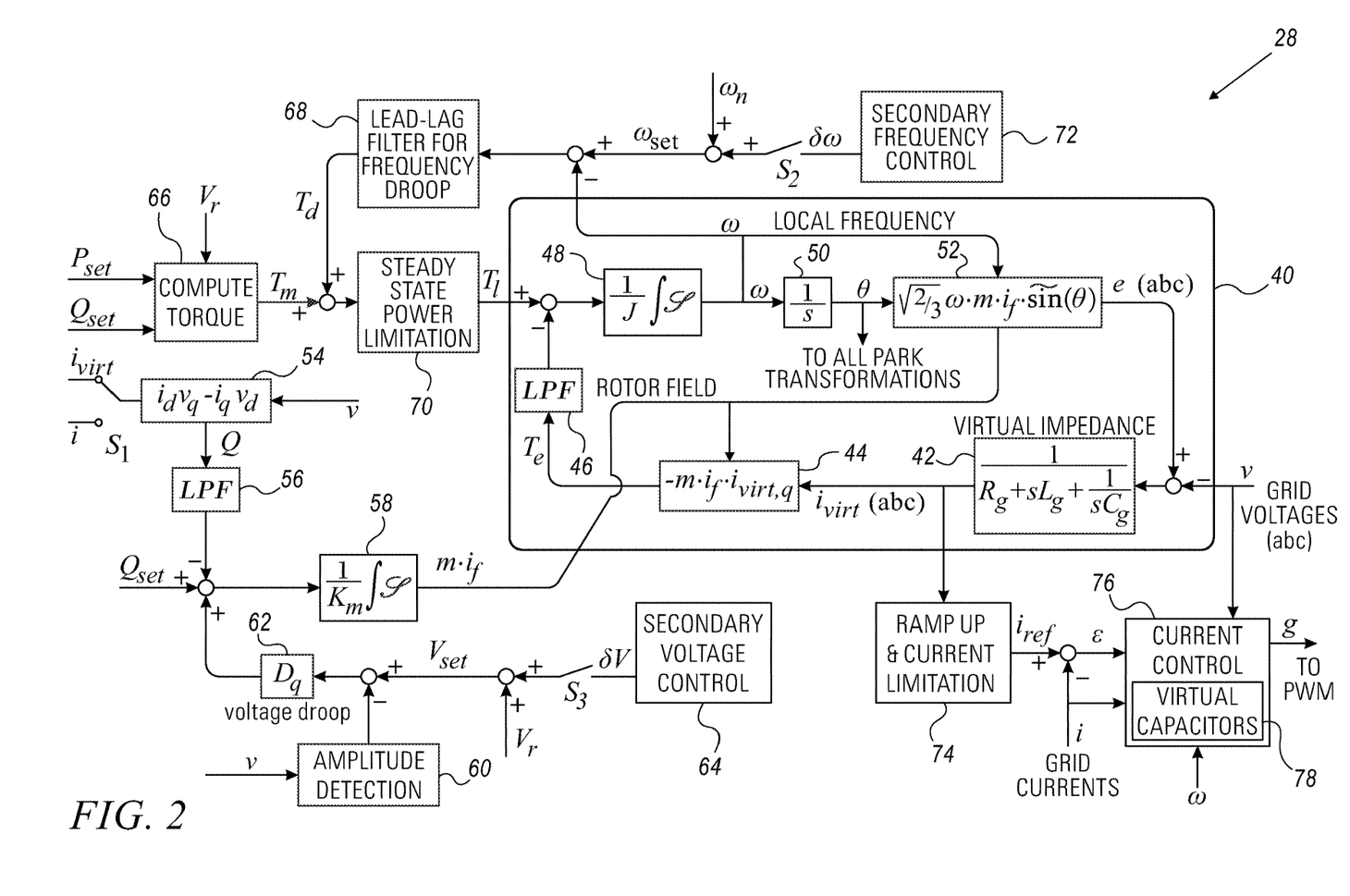
FIG. 2 is a block diagram that schematically illustrates a VSM controller, in accordance with an embodiment of the invention.

FIG. 2 is a block diagram that schematically illustrates the VSM control algorithm that is implemented by control circuitry 28, in accordance with an embodiment of the invention. The core of this algorithm is a model 40 of the synchronous machine that is emulated by inverter 24, in which three virtual currents $i_{virt}=(i_{virt,a}, i_{virt,b}, i_{virt,c})$ in the VSM give rise to the modeled electrical torque $T_e$ of the VSM, and also serve to generate reference currents for the current control loops, as described in detail below.

To generate $i_{virt}$, model 40 applies the difference between the internal synchronous voltage $e=(e_a, e_b, e_c)$ in the model and the measured voltage $v=(v_a, v_b, v_c)$ on the terminals of filter capacitors 34 of inverter 24 to a virtual impedance 42 (rather than to the actual filter impedance of inverter 24). Virtual impedance 42 consists, on each phase, of an inductor $L_g$ in series with a resistor $R_g$ and a capacitor $C_g$. Here $L_g$ and $R_g$ represent the equivalent stator inductance and resistance of a synchronous generator, while $C_g$ filters out DC components from the virtual currents. (The value $C_g$ is large enough so that at the grid frequency and at higher frequencies, its effect is negligible.) Thus, the virtual current in phase a, denoted $i_{virt,a}$, and the charge on the corresponding capacitor $C_g$, denoted $y_a$, satisfy the differential equations:

$$\frac{dy_a}{dt} = i_{virt,a},$$

$$L_g \frac{di_{virt,a}}{dt} + R_g i_{virt,a} + \frac{y_a}{C_g} = e_a - v_a$$

Phases b and c behave similarly. Because $L_g$ and $R_g$ are much larger than $L_S$ and $R_S$ (FIG. 1), the use of virtual impedance 42 reduces the effect of voltage measurement errors and grid voltage distortions on virtual currents $i_{virt}$, relative to models based on the actual currents flowing in the inverter. Furthermore, the virtual currents are insensitive to control-related delays that are inherent in the PWM process.

Based on the virtual currents, a torque generator 44 computes the electrical torque $T_e$, according to the formula:

$$T_e = M_f i_f \langle i_{virt}, \widetilde{\sin\theta} \rangle = -m i_f i_{virt,q}$$

This formula uses state variables of the VSM, namely the rotor angle $\theta$, the rotor current $i_f$, and the virtual currents $i_{virt}$. Here $M_f$ is the peak mutual inductance between the rotor winding and one stator winding and $m=\sqrt{3/2}M_f$. The following notation is used:

$$\widetilde{\sin}\theta = \left[\sin\theta \sin\left(\theta - \frac{2\pi}{3}\right) \sin\left(\theta + \frac{2\pi}{3}\right)\right]^T.$$

In the formula above and in the description that follows, $i_{virt,d}$ and $i_{virt,q}$ are the d and q components of the vector $i_{virt}(d, q, 0)$, which is generated by applying the Park transformation $U(\theta)$ to the virtual current vector $i_{virt}(a, b, c)$:

$$U(\theta) = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \\ 1/\sqrt{2} & 1/\sqrt{2} & 1/\sqrt{2} \end{bmatrix}.$$

The electrical torque $T_e$ computed by torque generator 44 passes through a low-pass filter 46 and is then subtracted from the limited active torque $T_l$. Changes in the value of $T_l$ emulate variations in the active torque due to changing operating conditions of system 20, as described in greater detail hereinbelow. The angular frequency $\omega$ of the rotor of the VSM varies as a function of this difference between limited active torque $T_l$ and electrical torque $T_e$, depending on the inertia J that is attributed to the emulated rotor:

$$J\frac{d\omega}{dt} = T_l - T_e$$

The value of J is selected depending upon the desired rate of response of the angular frequency $\omega$ of inverter 24 to changes in operating conditions. Based on this relation, a saturating integrator 48 computes the instantaneous angular frequency $\omega$. A further integration stage 50 gives the instantaneous rotor angle $\theta$, which is applied in the various Park transformations carried out by control circuitry 28.

Given the angular frequency, rotor angle, and rotor magnetic field (inductance times current), a multiplier 52 computes the synchronous internal voltages $e=(e_a, e_b, e_c)$ of the three phases of the VSM:

$$.e = \sqrt{\frac{2}{3}} \omega m i_f \widetilde{\sin}\theta$$

The measured voltages v are subtracted from these synchronous internal voltages to give a difference voltage, which are inputs to the three virtual impedances 42 as explained above.

To find the virtual rotor field $m i_f$, a multiplier 54 computes the reactive power output Q from inverter 24:

$$Q = i_d v_q - i_q v_d.$$

During the initial synchronization process upon startup of inverter 24, a switch $S_1$ inputs the virtual current $i_{virt}$ to multiplier 54. Subsequently, the switch inputs the actual output current i. The computed power is filtered by a low-pass filter 56 and is then subtracted from the preset reactive power $Q_{set}$.

The virtual rotor field is also affected by voltage droop, i.e., by the difference between the preset output voltage level $v_{set}$ and the actual amplitude of the voltages v. An amplitude detector 60 detects the amplitude of the voltages v, which is subtracted from $v_{set}$. The difference is multiplied by a selected voltage droop coefficient $D_q$ in a multiplier 62, and the result is added to $Q_{set}$. Optionally, a secondary voltage control block 64 may compute an additional incremental voltage 8V for addition to $v_{set}$, but this function can be neutralized in FIG. 2 by opening switch S3.

The virtual rotor current $i_f$ is related to the reactive power and voltage droop by the equation:

$$m\frac{di_f}{dt} = \frac{1}{K_m}\left[Q_{set} - Q + D_q\left(v_{set} - \sqrt{\frac{2}{3}}V\right)\right].$$

Here $K_m$ is a large constant. A saturating integrator 58 integrates over this equation in order to compute the emulated rotor field $m i_f$ for input to torque generator 44 and multiplier 52.

To find the limited active torque $T_l$, control circuitry 28 begins by computing the nominal active torque $T_m$ that will be needed to achieve, at equilibrium, the preset power values $P_{set}$ and $Q_{set}$, in a torque computation block 66. This computation uses the nominal value of the grid voltage, $V_r$, and the nominal grid frequency $\omega_n$:

$$T_m \omega - n. = P_{set} + \frac{2}{3}R_g \frac{P_{set}^2 + Q_{set}^2}{V_r^2}$$

In addition, lead-lag filter 68 takes into account the effect of frequency droop in generating a simulated droop torque $T_d$, which is added to the nominal active torque $T_m$. In physical synchronous generators, droop torque is generated to compensate for deviations in the angular frequency of the generator, for example due to increased load on the power grid. Control circuitry 28 accordingly computes the virtual droop torque based on the current difference between the desired angular frequency $\omega_{set}$ and the angular frequency $\omega$ of the virtual rotor in model 40. Optionally, a secondary frequency control block 72 may compute an additional incremental angular frequency $\delta\omega$ for addition to $\omega$ set, but this function can be neutralized in FIG. 2 by opening switch S2. Thus, in the present case, $\omega_{set}$ is equal to the nominal angular frequency $\omega_n$.

A lead-lag filter 68 is applied to the frequency difference $\omega_{set}-\omega$ in order to help stabilize the grid frequency while limiting the output power of inverter 24, in order to provide the droop torque. The operation of filter 68 can be expressed as follows using Laplace transforms (indicated by a hat above the symbol of the signal):

$$\hat{T}_d(s) = D_p \frac{1+\alpha\tau_d s}{1+\tau_d s}(\hat{\omega}_{set}-\hat{\omega})(s)$$

In this expression, $\tau_d$ is on the order of 1 sec, $D_p>0$ is the frequency droop constant for low frequencies, and $\alpha D_p$ is the frequency droop constant for high frequencies, with $\alpha \geq 1$. The addition of this emulated droop torque to model 40 allows inverter 24 to provide high additional current for short periods of time in order to compensate for frequency deviations, followed by lower added currents over longer periods in order to avoid overwhelming the available generation or storage capacity of system 20.

To protect inverter 24 from overload, a steady-state power limitation block 70 is applied to the sum of the nominal and droop torques. In the absence of block 70, the active torque $T_l$ would simply be the sum of $T_m+T_d$. Block 70 limits the steady-state value of $T_l$ to match the capacity of inverter 24, while still permitting fast transients in the torque to maintain stability when needed.

Figure 3:
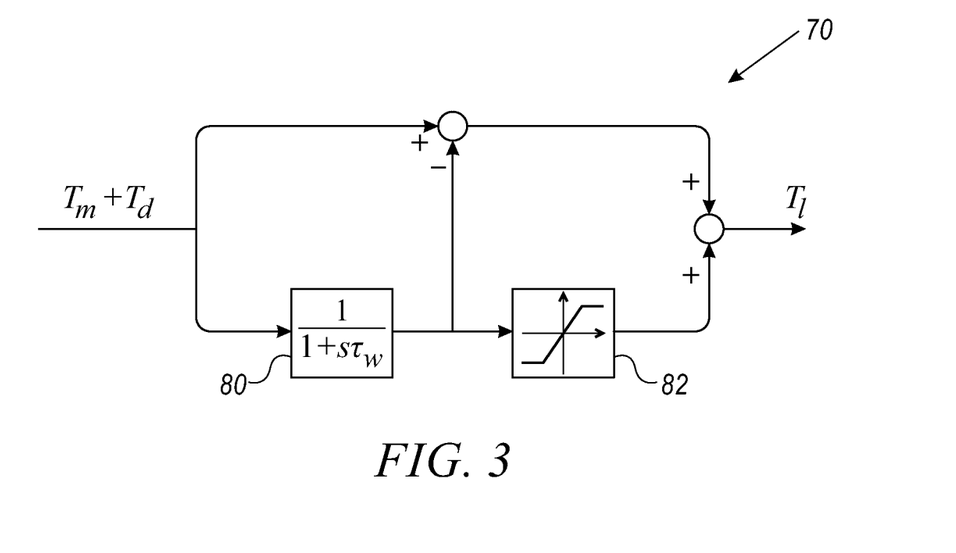
FIG. 3 is a block diagram that schematically shows details of a steady-state power limitation block in the VSM controller of FIG. 2, in accordance with an embodiment of the invention.

FIG. 3 is a block diagram that shows details of steady-state power limitation block 70, in accordance with an embodiment of the invention. Block 70 splits the signal $T_m+T_d$ into two complementary channels by using a low-pass filter 80. Low-pass filter 80 typically has a time constant $\tau_w$ on the order of 1 sec. A saturating limiter 82 is applied only to the low-pass channel. The two channels are added to give the limited active torque $T_l$.

Returning now to FIG. 2, the virtual currents $i_{virt}$ (a, b, c) flowing in model 40 are used in computing reference currents $i_{ref}$(d, q, 0) for input to a current control block 76, which generates the control voltages g using current control loops with virtual capacitors 78, as described below. Prior to input to current control block 76, however, a current ramp-up and limitation block 74 is applied to make sure that the maximal current of the inverter switches 30 is not exceeded. Current ramp-up and limitation block 74 computes the Park transform $i_{virt}$ (d, q, 0) of the currents $i_{virt}$ (a, b, c) before applying the limitation to $i_{virt}$ (d, q, 0), in order to maintain the clean sinusoidal shape of the output currents. The same block 74 also limits the rate at which $i_{ref}$ (d, q, 0) ramps up when inverter 24 starts operation in order to prevent possible damage to the inverter and reduce interference on the power grid due to current spikes. For example, $i_{ref}$ may ramp up to $i_{virt}$ over the course of a few seconds. The actual, measured grid currents, Park-transformed to i(d, q, 0), are then subtracted from the reference currents $i_{ref}$(d, q, 0) to generate error currents $\varepsilon$(d, q, 0) for input to current control loop 76.

Figure 4:
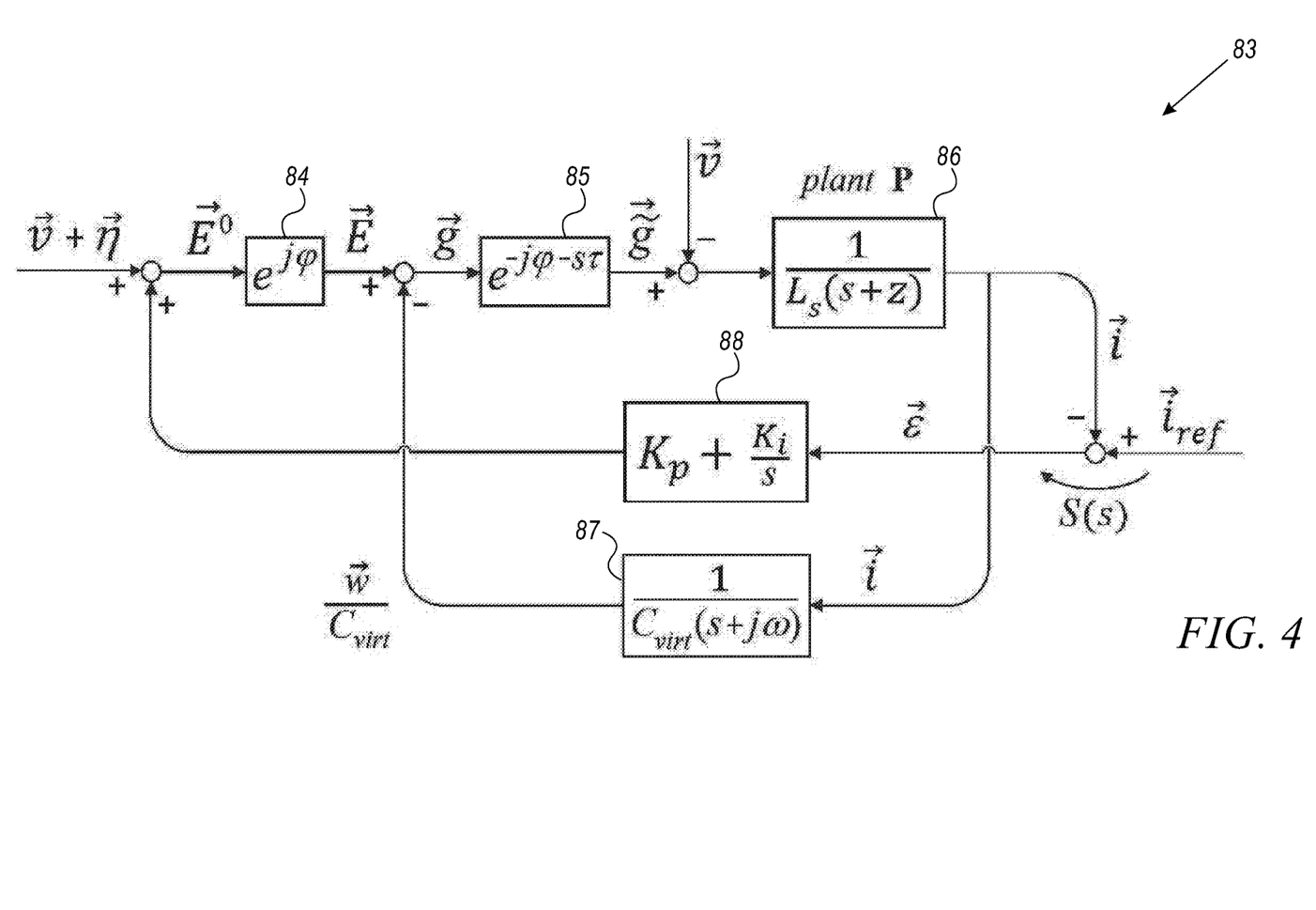
FIG. 4 is a block diagram that schematically illustrates current control loops, in which all the signals are obtained from Park transformations and are complex valued, in accordance with an embodiment of the invention.

FIG. 4 is a block diagram that schematically shows a current control loop 83, comprising a representation of an inverter circuit 86 (labeled as the plant P in the figure), a dq current controller 88, and virtual capacitors 87, in accordance with an embodiment of the invention. This diagram shows only Park-transformed variables, wherein the signals are represented as complex signals, with the d component being the real part, and the q component being the imaginary part. The current tracking error $\varepsilon$ is the difference between the reference current $i_{ref}$ and the actual current i. Current controller 88 is of the proportional-integral type, with parameters $K_p$ and $K_i$, and causes the error c to become very small in steady-state operation. The sensitivity S represents the transfer function from the reference current $i_{ref}$ to the error $\varepsilon$.

Figure 5:
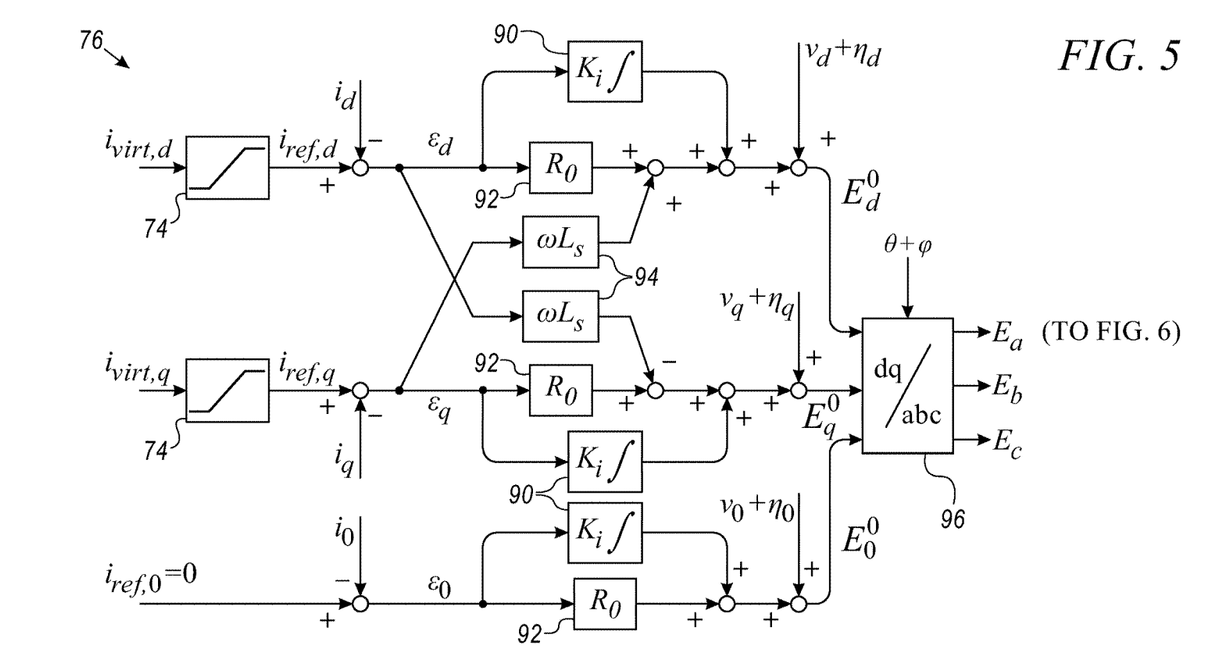
FIG. 5 is a block diagram that schematically shows details of the current control block in the VSM controller of FIG. 2, based on the conceptual diagram of FIG. 4, and in accordance with an embodiment of the invention.

FIG. 4 illustrates conceptual features of the control loop that are implemented in the detailed realization of dq current controller 88 that is shown in FIG. 5. In particular, the influence of the grid voltage v on the output currents is largely cancelled by adding (at the left side of the figure) the signal v to obtain $E^0$, and the influence of the processing delay and PWM delay is largely cancelled by multiplying $E^0$ by the phase correction $e^{j\varphi}$ in a phase correction block 84. These features help to increase the accuracy of the current control loop. Current control block 76 comprises phase correction block 84 and current controller 88. A delay block 85 represents the effect of the phase shift $-\varphi$ and the delay $\tau$ between the control voltages g that are output by control circuitry 28 and the corresponding average voltages $\tilde{g}$ that are output by switches 30 in inverter 24.

FIG. 5 is a block diagram that schematically shows details of current control block 76, in accordance with an embodiment of the invention. Block 76 comprises three current loops, which receive respective d, q and 0 components of the error currents $\varepsilon$(d, q, 0) and output the desired output voltages $E^0$(d, q, 0). Each loop includes an integrator block 90 with a coefficient $K_i$, and a proportional block 92 with a coefficient $R_0$. In addition, the d and q loops are linked by proportional blocks 94, with gain $\omega L_s$. Various choices of the block coefficients are possible. The choices may be based, for example, on a selected current loop bandwidth $\omega_b>\omega_n$, such that $K_i=L_s\omega_b^2$ and $R_0=2\omega_b L_s-R_s$.

The current loop outputs are summed with the corresponding components of the measured grid voltages v(d, q, 0), including any voltage measurement errors $\eta$(d, q, 0), as shown above in FIG. 4. An inverse Park transformation block 96 transforms the resulting output voltages $E^0$(d, q, 0) back to (a, b, c) coordinates ($E_a$, $E_b$, $E_c$). The transformation is performed, however, with the phase angle corrected to $\theta+\varphi$. The additional phase correction is given by $\varphi=\omega\tau$, wherein $\tau$ is the delay between the control voltages g that are output by control circuitry 28 and the corresponding average voltages $\tilde{g}$ that are output by switches 30 in inverter 24. Inverse Park transformation block 96 thus compensates for the effect of this delay in the operation of inverter 24.

Figure 6:
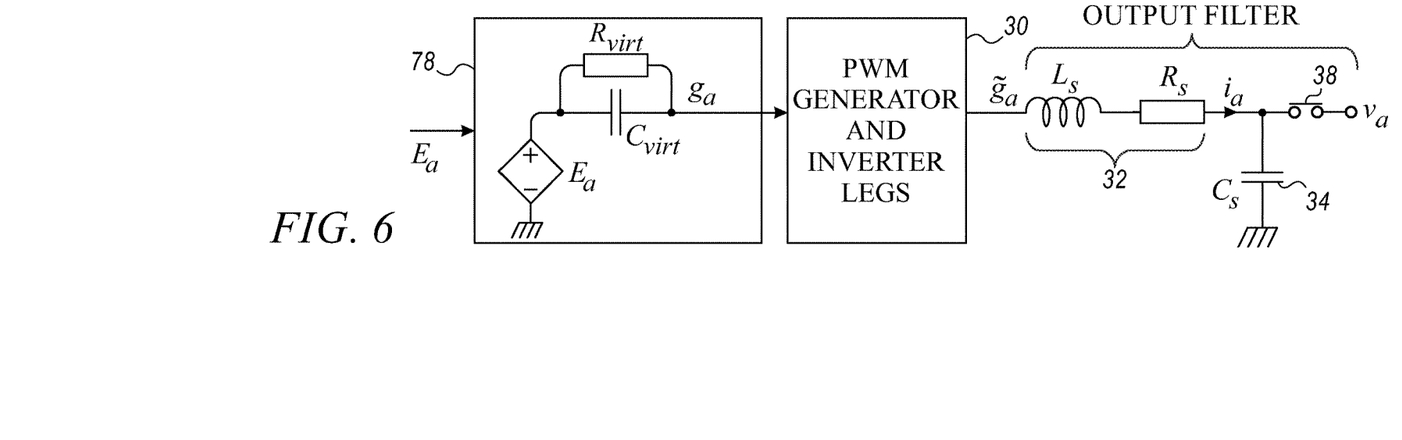
FIG. 6 is a block diagram that schematically shows details of a virtual capacitor in the VSM controller of FIG. 2, in accordance with an embodiment of the invention.

FIG. 6 is a block diagram that schematically shows details of virtual capacitor 78 at the output of current control block 76, in accordance with an embodiment of the invention. Although only the $E_a$ output is shown in FIG. 5 for the sake of simplicity, the $E_b$ and $E_c$ outputs are treated in similar fashion. The capacitance $C_{virt}$ of the virtual capacitor blocks DC components out of the output current $i_a$ by becoming charged with a DC voltage that is then subtracted from $E_a$.

The remaining voltage $g_a$ is the control voltage to PWM generator and drivers 26, which drive switches 30. (These components are represented collectively in FIG. 6 by block 30.)

A virtual resistance $R_{virt}$, in parallel with $C_{virt}$, normally has a high value, for example 1 kΩ, so that the current through it is insignificant. During start-up of inverter 24, however, $R_{virt}$ may be reduced to zero, and then ramps up to the high value over a few seconds in order to reduce the effect of current transients in inverter 24.

In the above description, control circuitry 28 applies a specific combination of functions in emulating a synchronous machine as to generate control voltages for PWM generator and drivers 26 that will facilitate stable, robust operation of inverter 24. In alternative embodiments, however, some of the functions of these features may be omitted, and other features may be added. For example, different models may be applied in generating the reference current inputs to current control block 76, and different sorts of current control loops may be used in block 76. As another example, other sorts of filters and limiting blocks may be used in conjunction with model 40 for handling changes in frequency and torque and for controlling start-up of inverter 24. Further variants, as well as explanation of various features of the present invention, are presented in the above-mentioned provisional patent application. All such alternative embodiments are considered to be in the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Electrical apparatus, comprising:
   an inverter having input terminals for receiving DC input power and output terminals for coupling to an AC power grid having three phases, and comprising an array of switches and filtering circuits configured to convert the DC input power to three-phase AC output power, by producing three output current waveforms at the output terminals;
   a pulse-width modulation (PWM) generator and drivers, which are coupled to drive the switches so as to control respective amplitudes, frequencies, and phases of the output current waveforms; and
   control circuitry, which is coupled to receive measurements of respective time-varying voltages and currents on the input and output terminals, and to compute a model, responsively to the measurements, that includes three virtual currents flowing in a synchronous machine that is emulated by the apparatus, wherein the three virtual currents are associated respectively with the three output current waveforms, and to control the PWM generator and drivers responsively to the three virtual currents so as to synchronize the amplitudes, frequencies, and phases of the three output current waveforms of the inverter with the three phases of the AC power grid.

2. The apparatus according to claim 1, wherein the model comprises current control loops, which generate three control voltages for controlling the PWM generator and drivers, and wherein the control circuitry is configured to compute, responsively to the virtual currents, reference currents for input to the current control loops.

3. The apparatus according to claim 2, wherein the control circuitry is configured to ramp the reference currents from zero to the virtual currents upon initiation of operation of the apparatus.

4. The apparatus according to claim 2, wherein the current control loop comprises virtual capacitors, which are applied to filter DC components out of the three output current waveforms by modifying average voltages output from the array of switches.

5. The apparatus according to claim 1, wherein the emulated synchronous machine has a given rotor angular frequency and rotor field, and wherein the control circuitry is configured to compute, responsively to the virtual currents, the rotor field, and a difference between the rotor angular frequency and a grid frequency of the AC power grid, an emulated limited active torque and an emulated electrical torque, for application to the synchronous machine, thus determining a time derivative of the rotor angular frequency.

6. The apparatus according to claim 5, wherein the emulated limited active torque comprises a droop torque, which is computed by applying a lead-lag filter to the difference between the rotor angular frequency and a desired angular frequency.

7. The apparatus according to claim 5, wherein the control circuitry is configured to apply a saturation to limit a low-frequency component of the active torque, thus determining the limited active torque.

8. The apparatus according to claim 5, wherein the control circuitry is configured to compute an electrical torque of the emulated synchronous machine based on the virtual currents and the rotor field, and to compute synchronous internal voltages of the emulated synchronous machine responsively to the rotor angular frequency, the rotor field, and a rotor angle of the emulated synchronous machine.

9. The apparatus according to claim 8, wherein the control circuitry is configured to compute a reactive power at the output terminals of the inverter and the rotor field of the emulated synchronous machine responsively to a voltage droop constant, a difference between an amplitude of a grid voltage of the AC power grid and a first preset value of the grid voltage, and a difference between a reactive power at the output terminals of the inverter and a second preset value of the reactive power.

10. The apparatus according to claim 8, wherein the control circuitry is configured to compute a difference voltage between the computed synchronous internal voltages and the measurements of the time-varying voltages, and to compute the virtual currents by applying a virtual impedance to the difference so as to eliminate a DC component in the virtual currents.

11. The apparatus according to claim 1, wherein the filtering circuits in the inverter have a given inductance and resistance, and wherein the model includes an equivalent stator inductance and resistance of the synchronous machine that are larger than the given inductance and resistance.

12. A method for electrical power control, comprising:
   applying a pulse-width modulation (PWM) drive to an inverter having input terminals for receiving a DC input voltage and output terminals for coupling to an AC power grid having three phases, and including an array of switches and filtering circuits configured to convert the DC input voltage to a three-phase AC output, including three output voltage waveforms, at the output terminals;

receiving measurements of respective time-varying voltages and currents on the input and output terminals;

computing a model, responsively to the measurements, that includes three virtual currents flowing in a synchronous machine that is emulated by the method, wherein the three virtual currents are associated respectively with the three output voltage waveforms; and controlling the PWM drive responsively to the three virtual currents so as to synchronize respective amplitudes, frequencies, and phases of the three output waveforms of the inverter with the three phases of the AC power grid.

13. The method according to claim 12, wherein the model comprises current control loops, which generate three control voltages for controlling the PWM drive, and wherein computing the model comprises computing, responsively to the virtual currents, reference currents for input to the current control loop.

14. The method according to claim 13, wherein computing the reference currents comprises ramping the reference currents from zero to the virtual currents upon initiation of operation of the method.

15. The method according to claim 13, wherein the current control loop comprises virtual capacitors, which are applied to filter DC components out of the three output current waveforms by modifying average voltages output from the array of switches.

16. The method according to claim 12, wherein the emulated synchronous machine has a given rotor angular frequency and rotor field, and wherein computing the model comprises computing, responsively to the virtual currents, the rotor field, and a difference between the rotor angular frequency and a grid frequency of the AC power grid, an emulated limited active torque and an emulated electrical torque, for application to the synchronous machine, thus determining a time derivative of the rotor angular frequency.

17. The method according to claim 16, wherein the emulated limited active torque comprises a droop torque, which is computed by applying a lead-lag filter to the difference between the rotor angular frequency and a desired angular frequency.

18. The method according to claim 16, wherein computing the emulated torque comprises applying a saturation to limit a low-frequency component of the active torque, thus determining the limited active torque.

19. The method according to claim 17, wherein computing the model comprises computing an electrical torque of the emulated synchronous machine based on the virtual currents and the rotor field, and computing synchronous internal voltages of the emulated synchronous machine responsively to the rotor angular frequency, the rotor field, and a rotor angle of the emulated synchronous machine.

20. The method according to claim 19, wherein computing the internal voltages comprises computing a reactive power at the output terminals of the inverter and the rotor field of the emulated synchronous machine responsively to a voltage droop constant, a difference between an amplitude of a grid voltage of the AC power grid and a first preset value of the grid voltage, and a difference between a reactive power at the output terminals of the inverter and a second preset value of the reactive power.

21. The method according to claim 19, wherein computing the model comprises computing a difference voltage between the computed synchronous internal voltages and the measurements of the time-varying voltages, and to compute the virtual currents by applying a virtual impedance to the difference so as to eliminate a DC component in the virtual currents.

22. The method according to claim 12, wherein the filtering circuits in the inverter have a given inductance and resistance, and wherein the model includes an equivalent stator inductance and resistance of the synchronous machine that are larger than the given inductance and resistance.

23. A computer software product for controlling a pulse-width modulation (PWM) drive that is applied to an inverter having input terminals for receiving a DC input voltage and output terminals for coupling to an AC power grid having three phases, and including an array of switches and filtering circuits configured to convert the DC input voltage to a three-phase AC output, including three output voltage waveforms, at the output terminals, the product comprising a tangible, non-transitory computer-readable medium in which program instructions are stored, wherein the instructions, when read by a programmable processor, cause the processor to receive measurements of respective time-varying voltages and currents on the input and output terminals, to compute a model, responsively to the measurements, that includes three virtual currents flowing in a synchronous machine that is emulated by the method, wherein the three virtual currents are associated respectively with the three output voltage waveforms, and to control the PWM drive responsively to the three virtual currents so as to synchronize respective amplitudes, frequencies, and phases of the three output waveforms of the inverter with the three phases of the AC power grid.

* * * * *